(12) United States Patent
Edwards et al.

(10) Patent No.: US 12,126,625 B2
(45) Date of Patent: Oct. 22, 2024

(54) SYSTEMS AND METHODS FOR DATA SECURITY

(71) Applicant: Capital One Services, LLC, McLean, VA (US)

(72) Inventors: Joshua Edwards, Philadelphia, PA (US); Mykhaylo Bulgakov, Arlington, VA (US); George Bergeron, Falls Church, VA (US); Andrea Montealegre, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 211 days.

(21) Appl. No.: 17/109,584

(22) Filed: Dec. 2, 2020

(65) Prior Publication Data

US 2022/0174070 A1 Jun. 2, 2022

(51) Int. Cl.
*H04L 9/00* (2022.01)
*H04L 9/40* (2022.01)

(52) U.S. Cl.
CPC ........ *H04L 63/107* (2013.01); *H04L 63/0272* (2013.01); *H04L 63/102* (2013.01); *H04L 63/1416* (2013.01)

(58) Field of Classification Search
CPC . H04L 63/107; H04L 63/0272; H04L 63/102; H04L 63/1416; G06Q 20/227; G06Q 20/351; G06Q 20/385; G06Q 20/4015; G06Q 20/405; G06Q 20/354
See application file for complete search history.

(56) References Cited

U.S. PATENT DOCUMENTS

| 10,296,897 B1* | 5/2019 | Wu ..................... G06Q 20/351 |
| 2005/0165684 A1* | 7/2005 | Jensen ................. G06Q 20/425 |
| | | 705/44 |
| 2014/0019350 A1 | 1/2014 | Buffa et al. |

(Continued)

FOREIGN PATENT DOCUMENTS

| WO | 2013/052141 A1 | 4/2013 |
| WO | 2020/219590 A1 | 10/2020 |

OTHER PUBLICATIONS

International Search Report and the Written Opinion of the International Searching Authority issued in related PCT Application No. PCT/US2021/060015 mailed Mar. 10, 2022.

(Continued)

*Primary Examiner* — Daniel B Potratz
*Assistant Examiner* — Syed M Ahsan
(74) *Attorney, Agent, or Firm* — HUNTON ANDREWS KURTH LLP

(57) ABSTRACT

A method comprises: monitoring a data stream comprising a plurality of data events; identifying a data pattern comprising one or more of the plurality of data events; determining that at least one of the data events comprising the data pattern supports virtual card generation; determining that the at least one of the data events comprising the data pattern is performed using a physical card number at a geolocation; determining that at least one virtual number has been associated with profile data associated with a user; transmitting a notification comprising a request to generate a virtual number; and upon receipt of an approval of the request, executing a script to generate the virtual number and associate the virtual number with the geolocation.

20 Claims, 5 Drawing Sheets

(56) References Cited

U.S. PATENT DOCUMENTS

| | | | |
|---|---|---|---|
| 2016/0275488 A1 | 9/2016 | Liu et al. | |
| 2018/0181956 A1* | 6/2018 | Zarakas | G06Q 20/3829 |
| 2018/0285860 A1* | 10/2018 | Prabhu | G06Q 20/325 |
| 2020/0005317 A1* | 1/2020 | Amor | G06Q 20/40 |
| 2020/0118187 A1 | 4/2020 | Benkreira et al. | |
| 2020/0294106 A1* | 9/2020 | Seshan | G06N 20/00 |
| 2020/0372490 A1* | 11/2020 | Ding | G06Q 20/3278 |

OTHER PUBLICATIONS

Notification Concerning Transmittal of Copy of International Preliminary Report on Patentability from related PCT Application No. PCT/US2021/060015, mailed Jun. 16, 2023, 10 pages.

* cited by examiner

SYSTEMS AND METHODS FOR DATA SECURITY

FIELD OF THE INVENTION

The present disclosure relates generally to data security technology, and more particularly, to systems and methods of card security based on virtual card numbers.

BACKGROUND

Electronic commerce is becoming increasingly widespread and common. Online shopping, where items are purchased online without presenting a physical credit card for payment, constitutes a large and growing sector of the global economy. With the number and value of goods purchased online, it is critical that secure credit transactions may be made.

One way to establish credit card data security is to use a virtual card number instead of the actual credit card number associated with a credit card account and which may be printed on a physical credit card. Virtual numbers may provide convenience for users by allowing them to put different cards on file at merchants than his or her actual card numbers. In addition, consumers may not need to change those saved virtual numbers later if they have a fraud event that causes his or her actual card number to become invalid. In addition, virtual numbers may provide security to the issuing institutions because they may prevent an account from being fully compromised in a fraud situation. However, virtual numbers have not been widely accepted by users. This may be due in part to users being unaware of virtual numbers and due to users being unaware or unsure of how to use virtual numbers.

Accordingly, there is a need to provide systems and methods of promoting use of virtual numbers to users in order to enhance data security.

SUMMARY

Embodiments of the present disclosure provide a system for data security. The system may comprise: a processor; a memory storing instructions executable by the processor; a web browser extension comprising one or more software modules configured to execute a script; and a database containing profile data associated with a user accessible by the processor, wherein the processor is configured to execute the instructions to: monitor a data stream comprising a plurality of data events, identify a data pattern comprising one or more of the plurality of data events, determine that at least one of the data events comprising the data pattern supports virtual card generation, determine that the at least one of the data events comprising the data pattern is performed using a physical card number at a geolocation, determine, by accessing the profile data, that at least one virtual number has been associated with the profile data, transmit a notification comprising a request to generate a virtual number, and upon receipt of an approval of the request, execute, by the web browser extension, the script to generate the virtual number and associate the virtual number with the geolocation.

Embodiments of the present disclosure provide a method for data security. The method may comprise: monitoring, by a processor, a data stream comprising a plurality of data events; identifying, by the processor, a data pattern comprising one or more of the plurality of data events; determining, by the processor, that at least one of the data events comprising the data supports virtual card generation; determining, by the processor, that the at least one of the data events comprising the data pattern is performed using a physical card number at a geolocation; determining, by the processor accessing profile data, that at least one virtual number has been associated with profile data associated with a user, wherein the profile data associated with the user is stored on a database accessible by the processor; transmitting, by the processor, a notification comprising a request to generate a virtual number; and upon receipt of an approval of the request, executing, by a web browser extension, a script to generate the virtual number and associate the virtual number with the geolocation.

Embodiments of the present disclosure provide a non-transitory computer-accessible medium having stored thereon computer-executable instructions for data security. When a computer arrangement executes the instructions, the computer arrangement is configured to perform procedures comprising: monitoring a data stream comprising a plurality of data events; identifying a data pattern comprising one or more of the plurality of data events; determining that at least one of the data events comprising the data pattern supports virtual card generation; determining that the at least one of the data events comprising the data pattern is performed using a physical card number at a geolocation; determining, by accessing profile data associated with a user, that at least one virtual number has been associated with the profile data associated with the user, wherein the profile data associated with the user is stored on a database accessible by the computer arrangement; transmitting a notification comprising a request to generate a virtual number; and upon receipt of an approval of the request, executing, by a web browser extension, a script to generate the virtual number and associate the virtual number with the geolocation.

Further features of the disclosed systems and methods, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
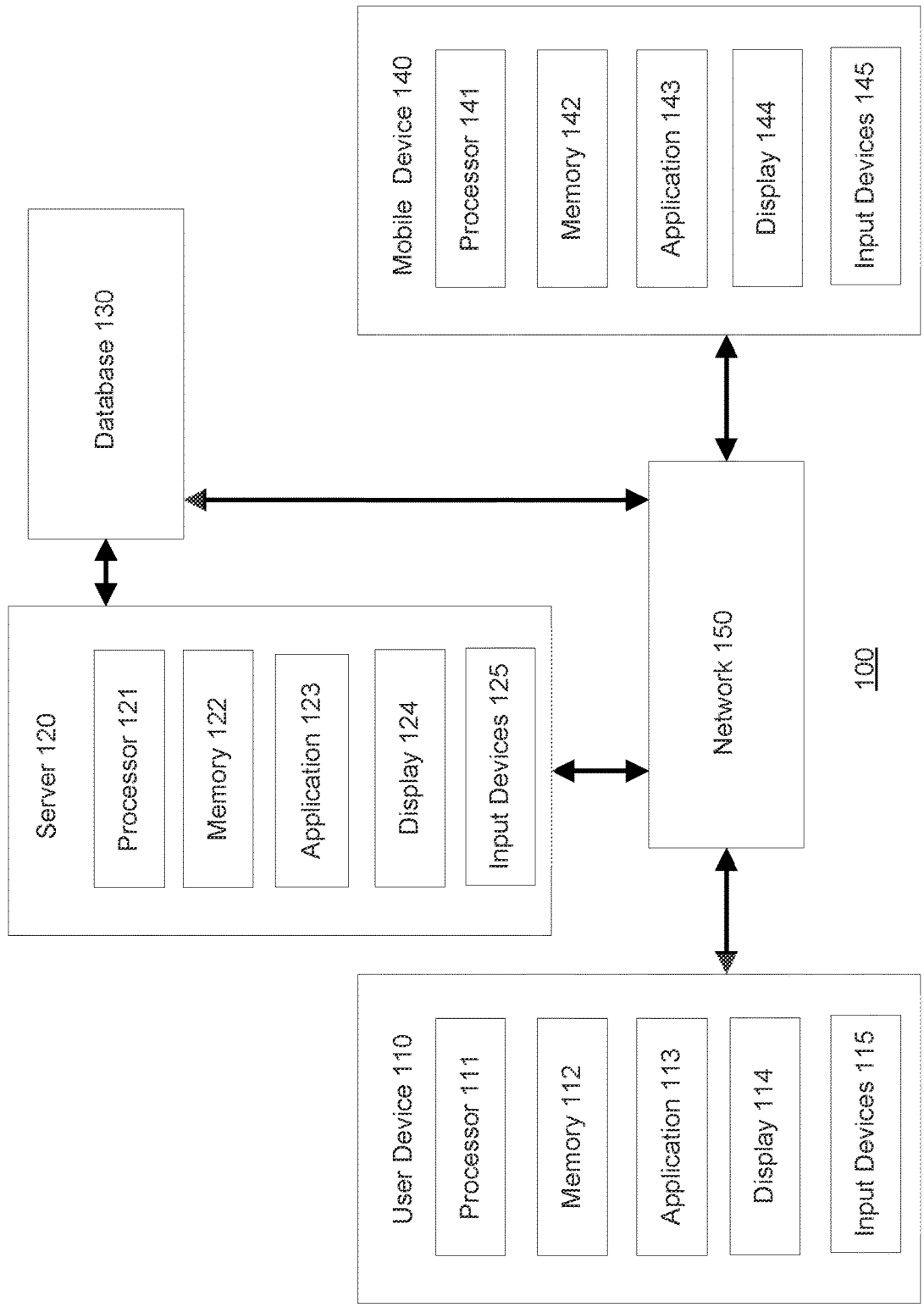
FIG. 1 is a diagram of a system for card data security according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

When a user has opted into a virtual card creation program, transaction streams of the user (e.g., online shopping) may be monitored as the transactions are being processed. The transactions may then be determined whether the transactions are being performed using a mean in which virtual card generation is supported (e.g., Card Not Present transactions, such as online purchases, telephone orders, and other transactions where the physical presence of a card is not required). The transactions may also be determined whether the transactions are being performed using a mean in which automated scripts are created for putting a virtual card on file. When it is detected from the transactions stream in real/near-real time that a Card Not Present transaction occurred using a physical card number (i.e., the user's actual account number, which may be physically printed on the card) with a merchant for which the automated scripts are created, a push notification may be sent out to the user recommending that the user replace the physical card number for a virtual number. Upon receipt of a confirmation from the user, the automated scripts may be triggered to generate a virtual number and to put the generated virtual number on file at the merchant from the push notification. This push notification may be a notification from a mobile application or a from a browser extension.

As used herein, a card may be any form of card. The card may include, but not limited to, a credit card, a gift card, a debit card, a reward card, and a cash card. However, the present disclosure is not limited to cards having financial functions, and it is understood that the present disclosure includes other types of cards, such as identity cards (e.g., driver's licenses, Social Security cards), membership cards, loyalty cards, travel cards (e.g., passports), badges, point of entry access cards, and other cards.

Example embodiments of the present disclosure provide systems and methods for card data security based on the use of virtual card numbers instead of physical card numbers. When a credit card physical number is to be replaced by a virtual card number, the automated scripts registered with a merchant website may update a card having the physical number on file to the virtual card number. Therefore, when there is a transaction occurring at a merchant in a transaction stream that is made when a physical card is not present, it is possible to check if any automated scripts or other procedures for virtual numbers are registered with that merchant. The user (e.g., the cardholder) may then be prompted through his or her smart phone with a push notification indicating that the transaction is not a card present transaction and that it is possible to replace the physical card on file at that merchant with a brand new virtual card number. If the user then accepts that prompt on the push notification, the automated scripts may be triggered off to generate a new virtual card number and replace the card on file at that merchant with the new virtual card number. This may be done with by the user by pressing a button presented on the push notification.

FIG. 1 illustrates a system 100 for card data security based on card number replacement according to an example embodiment. As further discussed below, the system 100 may include a user device 110, a server 120, a database 130, and a mobile device 140 in communication with one another using a network 150. Although FIG. 1 illustrates single instances of the components, the system 100 may include any number of components.

The user device 110 may be configured to have a web browser in which a browser extension may be installed. A user may use the web browser on the user device 100 to make online shopping. The browser extension may be configured to transmit a push notification to the mobile device 140 that may be used by the user. In some embodiments, the user device 110 and the mobile device 140 may be the same device. The server 120 may be configured to monitor data stream including transaction data of the user and to identify Card Not Present transactions from the data stream. The database 130 may contain profile data associated with the user that may include physical card numbers and virtual card numbers associated with the user.

The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, and an application 113. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 112 may be configured to store one or more software applications, such as the application 113, and other data, such as user's shopping and financial account information.

The application 113 may comprise one or more software applications, such as a merchant online shopping application, comprising instructions for execution on the user device 110. In some examples, the user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein.

The server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include a processor 121, a memory 122, and an application 123. The processor 121 may be a processor, a microprocessor, or other processor, and the server 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the server 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 122 may be configured to store one or more software applications, such as the application 123, and other data, such as user's shopping and financial account information.

The application 123 may comprise one or more software applications comprising instructions for execution on the server 120. In some examples, the server 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the application 123 may be executed to perform monitoring transaction data streams of users. Such processes may be implemented in software, such as software modules, for execution by computers or other machines. The application 123 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the server 120 that is available and supported by the server 120, such as a touch-screen, keyboard, mouse, cursor-control device, touch-screen, microphone, digital camera, video recorder or camcorder. These devices may be used to enter information and interact with the software and other devices described herein.

The database 130 may be one or more databases configured to store data, including without limitation, private information of users, financial accounts of users, identities of users, transactions of users, and certified and uncertified documents. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the server 120 or may be hosted externally of the server 120, such as by a server, by a cloud-based platform, or in any storage device that is in data communication with the server 120.

The mobile device 140 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The mobile device 140 may include a processor 141, a memory 142, and an application 143. The processor 141 may be a processor, a microprocessor, or other processor, and the mobile device 140 may include one or more of these processors. The processor 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 141 may be coupled to the memory 142. The memory 142 may be a read-only memory, write-once read-multiple memory or read/write memory, e.g., RAM, ROM, and EEPROM, and the mobile device 140 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 142 may be configured to store one or more software applications, such as the application 143, and other data, such as user's shopping and financial account information.

The application 143 may comprise one or more software applications comprising instructions for execution on the mobile device 140. In some examples, the mobile device 140 may execute one or more applications, such as software applications, that enable, for example, network communications with one or more components of the system 100, transmit and/or receive data, and perform the functions described herein. Upon execution by the processor 141, the application 143 may provide the functions described in this specification, specifically to execute and perform the steps and functions in the process flows described below. For example, the application 143 may be executed to receive push notifications from the user device 110. Such processes may be implemented in software, such as software modules, for execution by computers or other machines. The application 143 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The mobile device 140 may further include a display 144 and input devices 145. The display 144 may be any type of device for presenting visual information such as a computer monitor, a flat panel display, and a mobile device screen, including liquid crystal displays, light-emitting diode displays, plasma panels, and cathode ray tube displays. The input devices 145 may include any device for entering information into the mobile device 140 that is available and supported by the mobile device 140, such as a touch-screen, keyboard, mouse, cursor-control device, touch-screen, microphone, digital camera, video recorder or camcorder. These devices may be used to enter information and interact with the software and other devices described herein.

The system 100 may include one or more networks 150. In some examples, the network 150 may be one or more of a wireless network, a wired network or any combination of wireless network and wired network, and may be configured to connect the user device 110, the server 120, the database 130 and the mobile device 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the user device 110, the server 120, the database 130, and the mobile device 140 using the network 150 may occur using one or more front channels and one or more secure back channels. A front channel may be a communication protocol that employs a publicly accessible and/or unsecured communication channel such that a communication sent to the user device 110, the server 120, the database 130, and/or the mobile device 140 may originate from any other device, whether known or unknown to the user device 110, the server 120, the database 130, and/or the mobile device 140, if that device possesses the address (e.g., network address, Internet Protocol (IP) address) of the user device 110, the server 120, the database 130, and/or the mobile device 140. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the user device 110, the server 120, the database 130, and/or the mobile device 140 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

Figure 2:
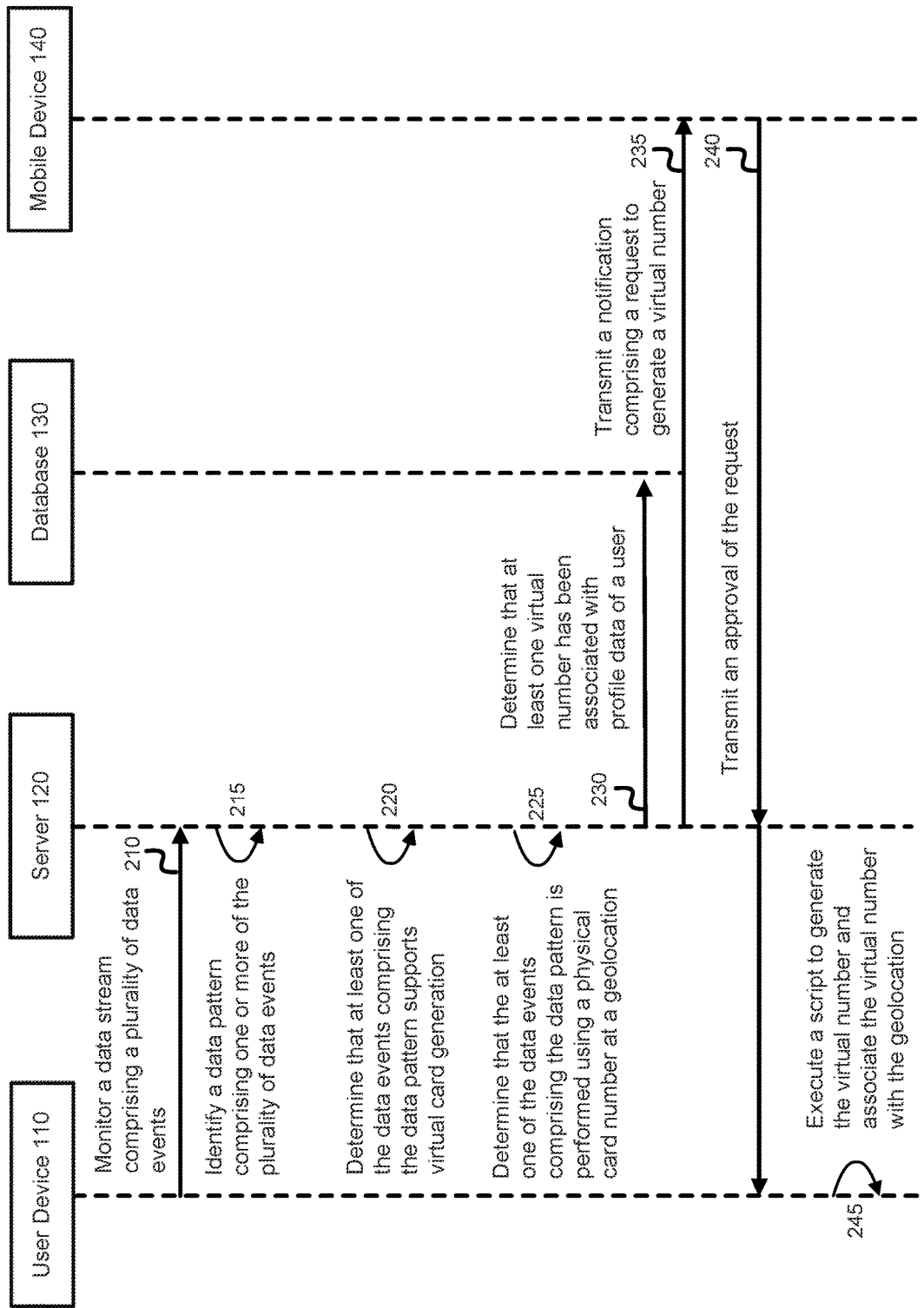
FIG. 2 is a sequence chart illustrating a method of card data security according to an example embodiment.

FIG. 2 illustrates a sequence diagram 200 of data security based on card number replacement according to an example embodiment. FIG. 2 may reference the same or similar components as those illustrated in FIG. 1, including a user device, a server, a database, a mobile device and a network.

In step 210, the server 120 may monitor a data stream associated with a user transmitted from the user device 110. For example, the server 120 may be associated with a financial institution who issues one or more credit cards to the user. The user may use the one or more credit cards to make online purchases on the user device 110 through a web browser installed on the user device 110. The data stream may comprise a plurality of data events comprising transaction data of the user, for example, when the user is shopping online using the one or more credit cards. The plurality of data events may also include, without limitation, transaction data with different physical and/or online merchants, transaction data using virtual card numbers, transaction data using physical data numbers, transaction data at different times, a lost card event, a fraud event (e.g., a data leak, a data breach, a comprised account, a comprised login credential, a transaction at a suspicious or unexpected location, fraudulent or suspicious activity associated with the account, fraudulent or suspicious activity associated with a merchant involved in a transaction with the account, a hacking attack or suspected hacking attack), and/or transaction data at different geographical locations. The server 120 may determine from the data stream where the transaction occurs, what time the transaction occurs, whether the transaction is a Card Present transaction or a Card Not Present transaction, and whether the credit card number is an actual physical card versus a virtual card number.

In step 215, the server 120 may detect and identify from the data stream a data pattern comprising one or more of the plurality of data events. The data pattern may including data events comprising, without limitation, transaction data with different physical and/or online merchants, transaction data using virtual card numbers, transaction data using physical data numbers, transaction data at different times, a lost card event, a fraud event (e.g., a data leak, a data breach, a comprised account, a comprised login credential, a transaction at a suspicious or unexpected location, fraudulent or suspicious activity associated with the account, fraudulent or suspicious activity associated with a merchant involved in a transaction with the account, a hacking attack or suspected hacking attack), and/or transaction data at different geographical locations.

In step 220, the server 120 may determine that at least one of the data events comprising the data supports virtual card generation. For example, for at least one of the data events, the data event can be performed in a manner compatible with a virtual card, such as a Card Not Present Transaction or other data event that is performed without presenting a physical card to the geolocation. As used herein, the term "geolocation" includes, without limitation, a merchant, a merchant's physical location, a merchant's online location, or other identifier for the merchant, place of business, or other entity involved in the transaction. It is understood that a geolocation includes physical merchant locations (e.g., brick and mortar stores or other venues) and non-physical merchant locations (e.g., websites, online commerce platforms, telephone-based businesses, or other venues lacking a physical location accessible to the consumer).

In step 225, the server 120 may determine that the at least one of the data events comprising the data pattern is performed using a physical card number at a geolocation (e.g., a merchant, a merchant's location, or other location identifier). For example, when the server 120 determines the at least one of the data events is an online purchase made by the user, as determined in the step 220, the server 120 may further determine whether the online purchase is made using a physical card number. The server 120 may access the database 130 to determine whether the user is using the physical card number or a virtual card number, which may be included in the profile data associated with the user.

In step 230, the server 120 may access the database 130 to determine that at least one virtual card number has been associated with the profile data associated with the user. The profile data associated with the user is stored on the database 130. The profile data associated with the user may comprise, but is not limited to, the user's name, the user's email addresses, the user's phone numbers, the user's mailing/billing address, physical card numbers associated with the user, and virtual card numbers associated with the user.

In step 235, the server 120 may transmit a notification comprising a request to generate a virtual number to the mobile device 140. The mobile device 140 may be a smart phone used by the user. The notification may be a push notification. If transactions are processed in real time, the push notification may be sent to the user in real time while the user's browser session is still logged in and authenticated with that merchant, which may streamline the user experience.

In addition, if the server 120 detects that the user has never used a virtual number before, the server 120 may not send the push notification to the mobile device 140 of the user.

In some embodiments, the notification may be pushed from the server 120 via an open socket to the web browser (the browser extension) of the user device 110, which then pushes the notification to the mobile device 140 of the user.

In some embodiments, the notification may be pull notification. For example, the web browser (through the browser extension) may detect that the user is making a purchase, and it is regularly and/or continuously asking via an API (e.g., every hundred milliseconds) the server 120 whether this notification be sent to the mobile device 140. The API may respond with either of "Yes" or "No". If the "Yes" is received by the web browser, the web browser may then send the notification to the mobile device 140. If the "No" is received by the web browser, the web browser may not send the notification to the mobile device 140.

In step 240, the user may use the mobile device 140 to transmit an approval of the request to the server 120. The approval of the request may indicate that the user agrees to generate a new virtual number to replace the physical card number used for the purchase. The server 120 may further forward the approval of the request to the web browser of the user device 110.

In step 245, upon receipt of the approval of the request, the web browser may execute via a browser extension to execute one or more scripts to generate the new virtual card number. The scripts may associate the new virtual card number with the geolocation (e.g., the merchant with which the online purchase is made). The one or scripts may be automated scripts registered with the geolocation (e.g., with the merchant). The scripts may be stored in the browser extension or may be received from the server 120. The scripts may be Java scripts or scripts created using other programming languages. The scripts are executed to place the new virtual number on file with the merchant. The new virtual number may be transmitted to the database 130 and stored on the database 130 to be associated with the profile data associated with the user.

The new virtual number may be generated by the browser extension via the scripts. The new virtual number may be any 16-digit number, for example, a 16 digit number including six digits as the bank identification number that is assigned based on the issuer. The new virtual number may be an old virtual number associated with the data file of the user, but with a different expiration date and/or security code, or a newly generated virtual number.

Once the scripts start execution, the web browser may be left open such that the scripts may complete automatically without further input from the user. In some embodiments, the scripts may need further inputs from the user Additional forms of input from the user may include manual interaction for a confirmation screen, an anti-bot protection (e.g., captcha), or password entry. Potentially the manual input can be used as a data point to improve the script for future uses on a merchant's website. If a script is unable to recover, the script can notify the user and provide the virtual number for the user to input manually.

In some embodiments, the notification may be sent to the mobile device 140 and/or the scripts may start being executed after the transaction is completed, for example, after the credit card issuer approves the transaction and the merchant has received the payment. This may be performed in near real time such that the scripts may be executed as soon as possible after the transaction has completed.

Figure 3:
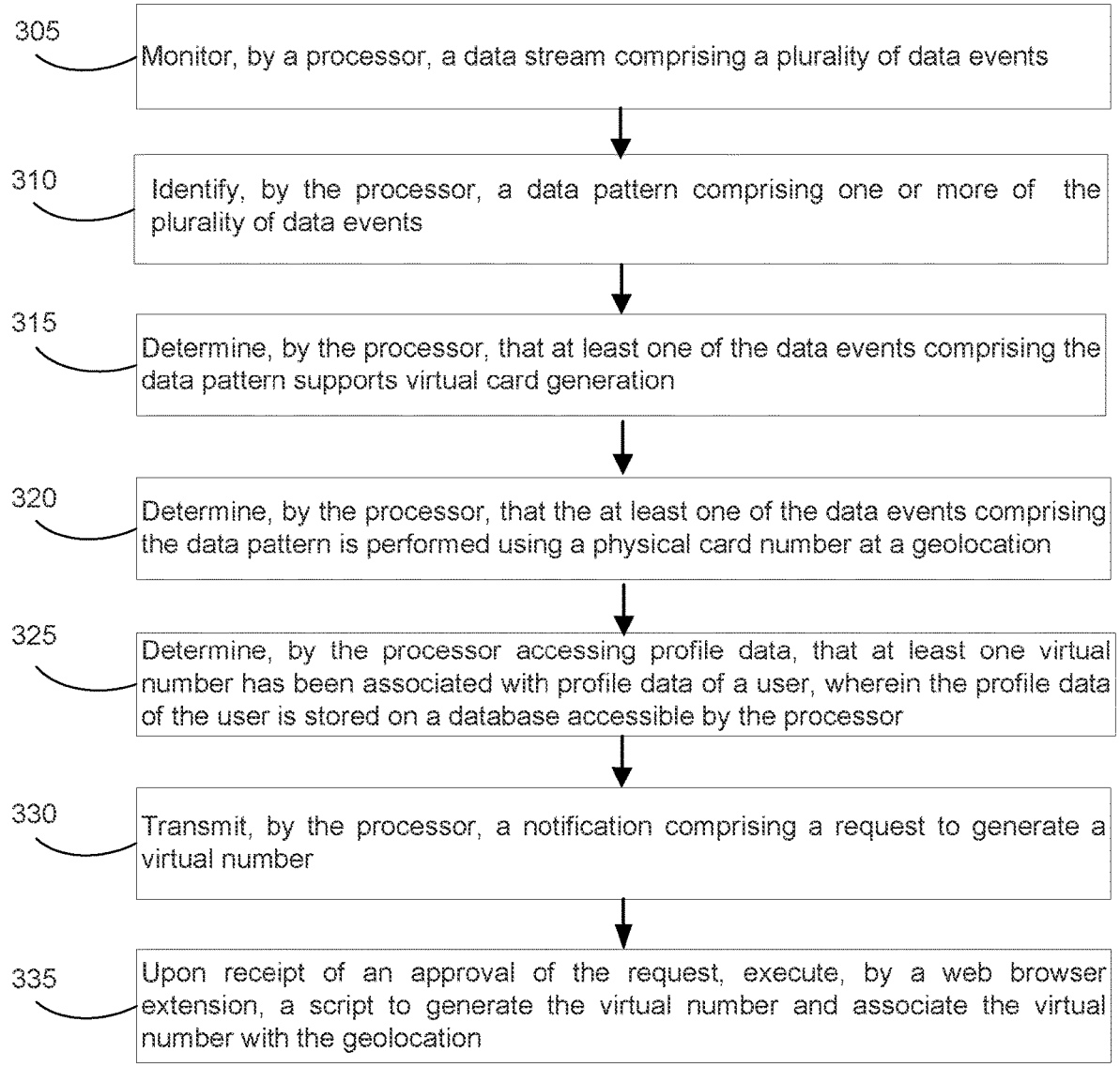
FIG. 3 is a flow chart illustrating a method of card data security according to an example embodiment.

FIG. 3 illustrates a flow chart for a method 300 of card data security based on card number replacement according to an example embodiment. FIG. 3 may reference the same or similar components as those illustrated in FIG. 1 and FIG. 2, including, a user device, a server, a database, a mobile device, and a network. The method 300 may be implemented in the system 100 and may comprise the following steps.

In step 305, a data stream comprising a plurality of data events is monitored by a processor, for example, the server 120. The data stream may comprise transactions data (the plurality of data events) of the user, for example, when the user is shopping online using one or more credit cards.

In step 310, a data pattern comprising one or more of the plurality of data events is detected and identified by the processor.

In step 315, at least one of the data events comprising the data pattern is determined, by the processor, to support virtual card generation. For example, for at least one of the data events, the data event can be performed in a manner compatible with a virtual card, such as a Card Not Present Transaction or other data event that is performed without presenting a physical card to the geolocation (e.g., the merchant).

In step 320, the at least one of the data events comprising the data pattern is determined, by the processor, to be performed using a physical card number at the geolocation. The processor may access the database 130 to compare the card number in the data event with physical card numbers in the profile data associated with the user stored in the database 130, which may determine if the data event (a transaction, for example, an online purchase by the user using the user device 110) is performed using a physical card number.

In step 325, the processor may access the profile data associated with the user to determine that at least one virtual number has been associated with the profile data associated with the user. The profile data associated with the user is stored on the database 130 accessible by the processor. For example, the processor may determine that the user has ever used a virtual card number before, which is indicated in the data file of the user.

The processor may further determine whether the user opts in a virtual number program. That is, the profile data may include data indicative of the user opting in a virtual card creation program. The processor may check if the user has ever created a virtual number for this merchant, and/or if the user has ever shown an indication that the user is actually interested in opting in the virtual card creation program or creating a virtual number.

In step 330, the processor may transmit a notification comprising a request to generate a virtual number to the mobile device 140 of the user. The notification may be transmitted to the web browser installed on the user device 110 of the user, where the user is using the web browser of the user device 110 is making the online purchase with the merchant. The notification may then be transmitted to the mobile device 140 of the user by the web browser (via the browser extension installed on the web browser).

In some embodiments, the notification is a push notification transmitted to the user from a mobile application that may be installed on the mobile device 140. In this case, the user may be required or prompted to log into the mobile application to receive, check and reply to the notification.

In step 335, upon receipt of an approval of the request, the processor may execute, via the web browser extension, a script to generate the virtual number and associate the virtual number with the geolocation (e.g., the merchant). If the push notification is sent and the user does not respond the script may not be executed to generate a new virtual number. Alternately, such no response from the user may be indicative of a potential opportunity for a virtual card number and be ready for next transaction.

In some embodiments, if no response is received from the user, another notification may not be sent to the user until a certain period of time has passed, for example, a week, so that the user is not annoyed and turns off all future notifications. In some embodiments, if no response is received from the user, an additional notification may be intentionally sent to the user repeatedly assuming that the earlier notification might not have caught the user or it might not have been a good time for the user.

In some embodiments, if no response is received from the user, the processor may flag what time the notification is sent to the user so that a future notification will not sent to the user again at that time or during that time window. For example, a purchase is made at 8:00 am, another notification may not be sent at 8:00 am. But if a transaction from the user is made later on, for instance, at 6:00 pm, since that is in a different time window a notification may be sent to the user at that point.

Additionally, when a new virtual number is created, restrictions may be placed on the new virtual number for fraud prevention and security purposes. For example, the new virtual number may be specified only work at a certain merchant. Accordingly, if that virtual number is provided for any purposes other than paying that specific merchant then the payment may be declined. The new virtual number may be specified to work for only one transaction. The new virtual number may be configured to only use for an activity data event (e.g., purchasing a sports event ticket) less than a predetermined amount of value, for example, it cannot be used for more than $100 in a single transaction. All of these may increase the data security of the user. One of the other advantages of virtual numbers is that: if the piece of plastic physical card gets compromised, the virtual number on the user's account that was put on file may continue to work properly even as a reissuance of the piece of plastic physical card is being processed, because the card number of the plastic physical card is not the same as the virtual number.

In some embodiments, the web browser extension may be deployed on the web browser by the user, for example, downloading the web browser extension from the server 120. When the user goes to a certain web site for online shopping, the web browser extension may generate the virtual number and then run the automated scripts to put it on file with a merchant for the user. The automated scripts may be registered with the web site associated with an entity (e.g., the merchant), and the entity is associated with the geolocation where the online shopping occurs.

In some embodiments, the new virtual number may be one of the old virtual numbers associated with the user, but with a different expiration data and/or a secure code.

Some example indications are provided herein that the user has ever associated with at least one virtual number in the past, which may be used in FIGS. 2 and 3 for determining whether to send the notification to the user (step 230 in FIG. 2 and step 325 in FIG. 3) according to an example embodiment.

The user may be associated with the at least one virtual number in the past that is indicated in the profile data associated with the user. The association may include, but not limited to, the at least one virtual number has been used in the past; the at least one virtual number has been created in the past; and the at least one virtual number has been deleted in the past. Accordingly a virtual number history of the user that may be maintained on the database 130, which may facilitate an understanding of the user's preferences.

For example, the user may have deleted a virtual number, a set of virtual numbers, or all of his or her virtual numbers. Alternatively, the user may have ever stopped or suspended a virtual number, a set of virtual numbers, or all of his or her virtual numbers. This may be reflected in the profile data associated with the user in the database 130, which may indicate that the user is associated with at least one virtual number in the past.

For example, the user may have created a virtual number, a set of virtual numbers, or all of his or her virtual numbers, for example, for different merchants. This may be reflected in the profile data associated with the user in the database 130, which may indicate that the user is associated with at least one virtual number in the past. Further, by checking how long ago one or more virtual numbers were created (e.g., the day, week, month), it may determine that it is likely indicative that the user is trying to use virtual numbers more frequently and that the user is more receptive to the notification. If the user has not created a virtual number in two, three, or four months, that may be indicative the user stops caring about virtual numbers or forgets about the virtual number program, and the user may or may not be receptive to the notification.

For example, if the user has a virtual number that is associated with a merchant and yet the user is charging his or her physical card number (not using the virtual number), this may be indicative that his or her perception of the virtual number program has gone down. The user may be less likely to want to put more virtual numbers on file. In such a situation, the notification may not be sent to the user.

Figure 4:
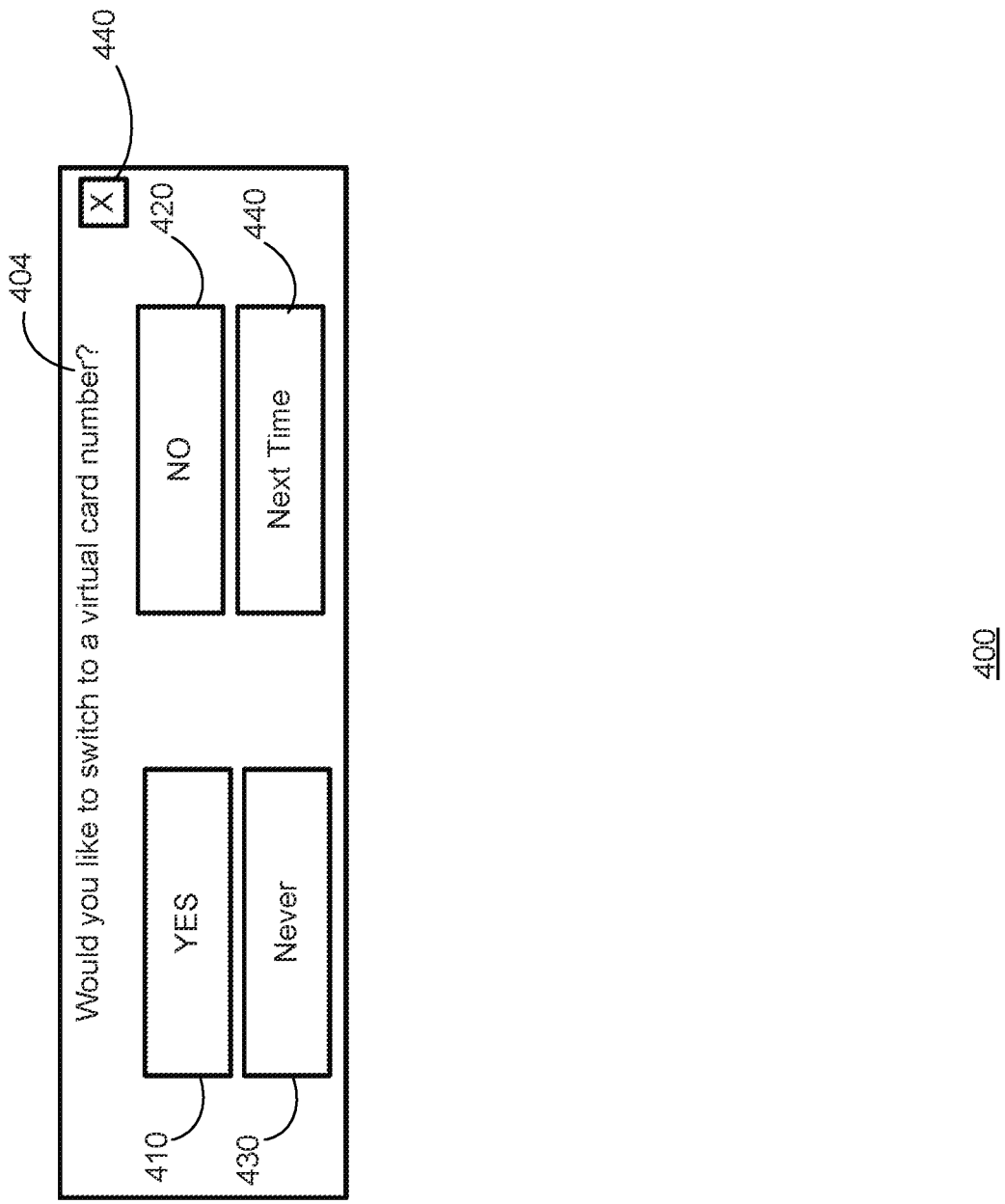
FIG. 4 is an example push notification according to an example embodiment.

An example notification 400 received by the mobile device 140 of the user is illustrated in FIG. 4 according to an embodiment of the present disclosure. FIG. 4 may reference the same or similar components as those illustrated in FIGS. 1-3, including a user device, a server, a database, a mobile device and a network.

The notification 400 may comprise text 405, such as "Would you like to switch to a virtual number?" Upon receipt the notification 400, the user may agree to switch to a virtual number by clicking on, for example, the "Yes" button 410. The user may not want to switch to a virtual number for the current transaction by clicking on, for example the "No" button 420. Further, the user may not want to be bothered by any such notification for future virtual numbers, the user may then reply by clicking on the "Never" button 430, so that the mobile device 140 will not receive any future notification. In some cases, the user may not want to switch to a virtual number this time but want to do so next time, so the user may explicitly reply by clicking on the "Next Time" button 440. Various other buttons may be further included in the notification. If the user does not want to reply the notification at all, the user may simply click on the check symbol 450 to close and ignore the notification.

Figure 5:
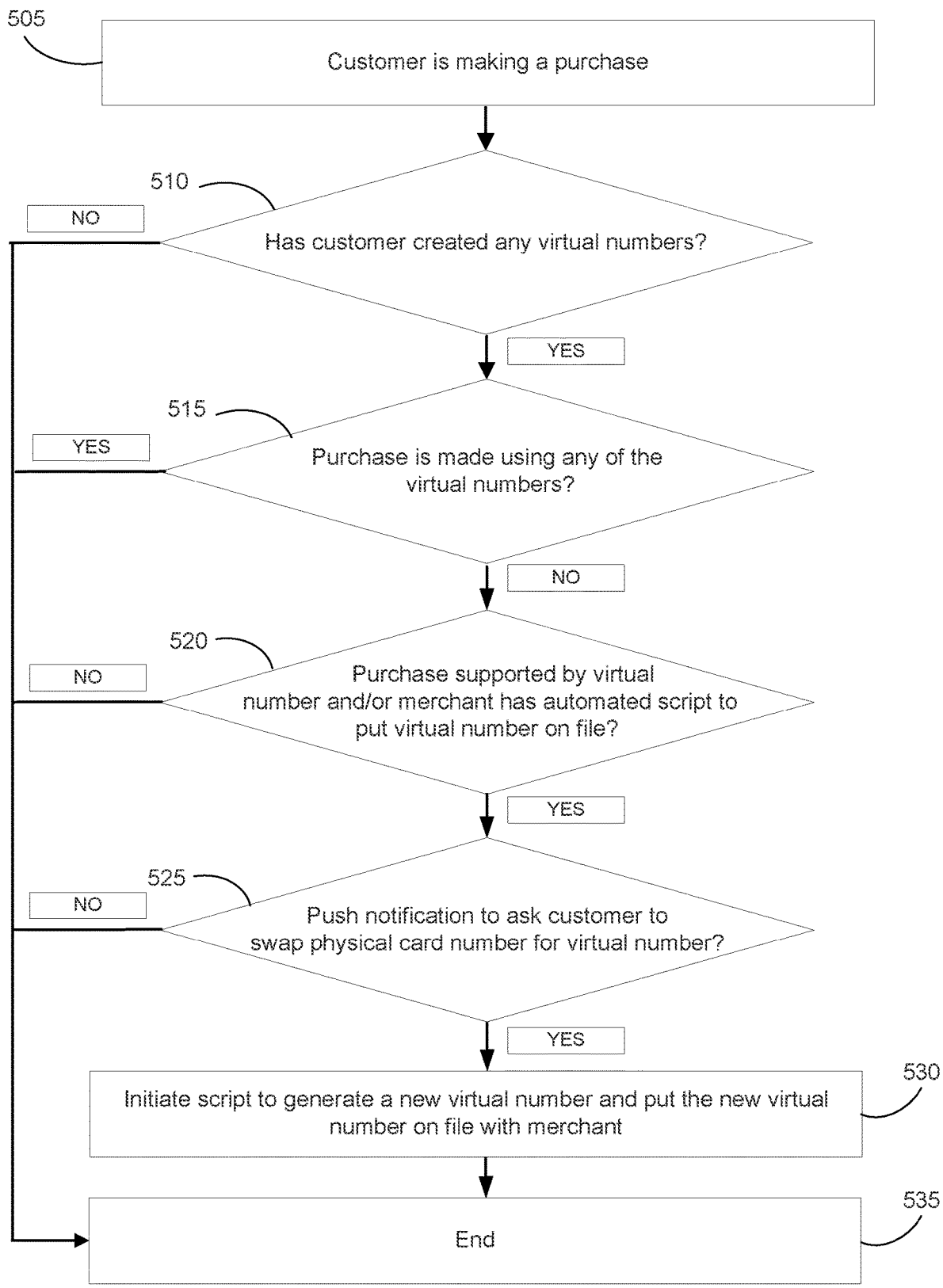
FIG. 5 is a flow chart illustrating a method of an example use case according to an example embodiment.

FIG. 5 illustrates a flow chart of a method 500 for an example use case of the data security system described above according to an example embodiment. FIG. 5 may reference the same or similar components as those illustrated in FIGS. 1-4, including a user device, a server, a database, a mobile device, and a network.

In step 505, a customer is making a purchase. For example, the customer is making the purchase online with a merchant by visiting a shopping website of the merchant on the user device 110.

In step 510, it is determined whether the customer has created any virtual numbers in the past. If the customer has never created a virtual number (i.e., the "No" branch is selected), it may indicate that the customer is not interested in the virtual card program/creating a virtual number, and so the method 500 proceeds to step 535 in which the method 500 ends.

If the "Yes" branch is selected, the method 500 proceeds to step 515. In step 515, it is determined whether this purchase is made using any of the virtual numbers the customer has created in the past. If this purchase is made using a virtual number created by the customer in the past (the "Yes" branch is selected), it is then no necessary requesting the customer to use to a virtual number or create a new virtual number for this purchase, and so the method 500 proceeds to step 535 in which the method 500 ends. If the "No" branch is selected, the method 500 proceeds to step 520.

In step 520, it is determined whether this purchase is easily supported by virtual number and/or merchant has automated script created for putting virtual number on file. If the "No" branch is selected, the method 500 proceeds to step 535 in which the method 500 ends. If the "Yes" branch is selected, the method 500 proceeds to step 525.

In step 525, a push notification is sent to the mobile device 140 to ask the customer if they want to use a virtual number instead of the physical number. If the "No" branch is selected, the method 500 proceeds to step 535 in which the method 500 ends. If the "Yes" branch is selected, the method 500 proceeds to step 530.

In step 530, upon receipt of the approval from the user, the automated script is initiated to generate a new virtual number and put the new virtual number on file with the merchant. The method 500 ends in step 535.

In some embodiments, the automated scripts may be initiated and executed in a mobile application instead of by the web browser extension of the web browser. So when the push notification is received on the mobile device 140 of the user, the user may be required to provide the login credentials on the mobile application to initiate and execute the automated scripts for creating the new virtual number and placing the new virtual number on file with the merchant. This may improve the data security of the user at a higher likelihood.

In some embodiment, if the user ignores or declines a notification for the first merchant, then a notification may not be sent to the user for the next merchant either, because the user may not be interested in or not want to be bothered if the user does not accept the notification for the first merchant. A notification may then be sent to the user for another merchant after a period of time, such as a week. This may improve user's experience.

The present invention allows for improving data security while not impacting merchants. From the merchant's perspective, a valid 16-digit virtual number, the same as a valid 16-digit physical card number, is received. This advantageously impact on the merchant's transaction processing. In the meantime, the virtual numbers allow the user and the card's issuer to employ credit card protections to ensure data security and reduce the risk of fraud.

In addition, since the virtual card numbers are different from the physical card number associated with a user's account, the virtual card numbers may not need to be replaced in the event that the user loses his or her card or the physical card number is otherwise comprised. This may reduce the administrative burden on the user after a physical number is compromised, and may also reduce the risk of fraud to the issuing institution and merchants.

Throughout the disclosure, the term merchant is used, and it is understood that the present disclosure is not limited to a particular merchant or type of merchant. Rather, the present disclosure includes any type of merchant, vendor, or other entity involving in activities where products or services are sold or otherwise provided.

In some examples, exemplary procedures in accordance with the present disclosure described herein may be performed by a processing arrangement and/or a computing arrangement (e.g., computer hardware arrangement). Such processing/computing arrangement may be, for example entirely or a part of, or include, but not limited to, a computer/processor that may include, for example one or more microprocessors, and use instructions stored on a computer-accessible medium (e.g., RAM, ROM, hard drive, or other storage device). For example, a computer-accessible medium may be part of the memory of the delivery device 120 or 550, the user device 520, the server 130 or 530, and/or the contactless card 110 or 510 or other computer hardware arrangement.

In some examples, a computer-accessible medium (e.g., as described herein above, a storage device such as a hard disk, floppy disk, memory stick, CD-ROM, RAM, ROM, etc., or a collection thereof) may be provided (e.g., in communication with the processing arrangement). The computer-accessible medium may contain executable instructions thereon. In addition or alternatively, a storage arrangement may be provided separately from the computer-accessible medium, which may provide the instructions to the processing arrangement so as to configure the processing arrangement to execute certain exemplary procedures, processes, and methods, as described herein above, for example.

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for data security, comprising:
   a processor;
   a memory storing instructions executable by the processor;

a web browser extension installed on a user device used by the user and comprising one or more software modules configured to execute a script; and a database containing profile data associated with a user accessible by the processor, wherein the processor is configured to execute the instructions to:

deploy the web browser extension on a web browser installed on the user device used by the user, monitor a data stream comprising a plurality of data events, identify a data pattern comprising one or more of the plurality of data events, determine that at least one of the data events comprising the data pattern supports virtual card generation, determine that the at least one of the data events comprising the data pattern is performed using a physical card number at a geolocation, determine, by accessing the profile data, that at least one old virtual number has been associated with the profile data, wherein the association of the at least one old virtual number with the profile data includes that the at least one old virtual number has been deleted in the past, receive, via an application programming interface (API) of the processor, from the web browser extension on the web browser installed on the user device used by the user, an inquiry whether a notification comprising a request to generate a virtual number will be sent to a mobile device used by the user, in response to a positive answer to the inquiry, transmit the notification comprising the request to generate a virtual number to the mobile device used by the user, the notification being transmitted from the web browser extension to the mobile device used by the user, and upon receipt of an approval of the request, execute, by the web browser extension, the script to:

generate the virtual number, wherein generating the virtual number includes retrieving one of the at least one old virtual number, and associate the virtual number with the geolocation.

2. The system of claim 1, wherein the processor is further configured to execute the instructions to:

determine, by accessing the profile data, whether the profile data includes data indicative of opting in a virtual card creation program.

3. The system of claim 1, wherein supporting virtual card generation comprises performing at least one of the data events without presenting a physical card to the geolocation.

4. The system of claim 1, wherein the association of the at least one old virtual number with the profile data further includes at least one of (1) the at least one old virtual number has been used in the past, and (2) the at least one old virtual number has been created in the past.

5. The system of claim 1, wherein the at least one of the data events in the data stream is performed in a web browser of the geolocation.

6. The system of claim 1, wherein the virtual number is only used for the at least one of the data events in the data stream.

7. The system of claim 1, wherein the virtual number is the retrieved one of the at least one old virtual number.

8. The system of claim 1, wherein the virtual number is a new virtual number generated by executing the script.

9. The system of claim 1, wherein the notification is a push notification transmitted from the web browser extension.

10. The system of claim 1, wherein:

the script is registered with a web site associated with an entity, and the entity is associated with the geolocation.

11. The system of claim 1, wherein the virtual number is generated by the web browser extension.

12. The system of claim 1, wherein the virtual number is used only for a specified number of geolocations.

13. A method for data security, comprising:

deploying, by a processor, a web browser extension on a web browser installed on a user device used by a user;

monitoring, by the processor, a data stream comprising a plurality of data events;

identifying, by the processor, a data pattern comprising one or more of the plurality of data events;

determining, by the processor, that at least one of the data events comprising the data pattern supports virtual card generation;

determining, by the processor, that the at least one of the data events comprising the data pattern is performed using a physical card number at a geolocation;

determining, by the processor accessing profile data, that at least one old virtual number has been associated with profile data associated with the user, wherein the profile data associated with the user is stored on a database accessible by the processor and wherein the association of the at least one old virtual number with the profile data includes that the at least one old virtual number has been deleted in the past;

receiving, via an application programming interface (API) of the processor, from the web browser extension on the web browser installed on the user device used by the user, an inquiry whether a notification comprising a request to generate a virtual number will be sent to a mobile device used by the user;

in response to a positive answer to the inquiry, transmitting, by the processor, the notification comprising the request to generate a virtual number to the mobile device used by the user, the notification being transmitted from the web browser extension to the mobile device used by the user; and upon receipt of an approval of the request, causing, by the processor, the web browser extension to execute a script to:

generate the virtual number, wherein generating the virtual number includes retrieving one of the at least one old virtual number, and associate the virtual number with the geolocation.

14. The method of claim 13, wherein the virtual number is only used for the at least one of the data events in the data stream.

15. The method of claim 13, wherein the virtual number is only used for activity data event less than a predetermined amount of value.

16. The method of claim 13, wherein the at least one of the data events in the data stream is performed in a web browser of the geolocation.

17. The method of claim 13, wherein the notification is a push notification transmitted to the user from a mobile application.

18. The method of claim 13, wherein the at least one of the data events in the data stream is a data event that is performed by the user without presenting a physical card to the geolocation.

19. The method of claim 13, further comprising determining, by the processor, whether the geolocation has the script created for putting the virtual number on file at the geolocation.

20. A non-transitory computer-accessible medium having stored thereon computer-executable instructions for data security, wherein, when a computer arrangement executes the instructions, the computer arrangement is configured to perform procedures comprising:

deploying a web browser extension on a web browser installed on a user device used by a user;

monitoring a data stream comprising a plurality of data events;

identifying a data pattern comprising one or more of the plurality of data events;

determining that at least one of the data events comprising the data pattern supports virtual card generation;

determining that the at least one of the data events comprising the data pattern is performed using a physical card number at a geolocation;

determining, by accessing profile data associated with the user, that at least one old virtual number has been associated with the profile data associated with the user, wherein the profile data associated with the user is stored on a database accessible by the computer arrangement, and wherein the association of the at least one old virtual number with the profile data includes that the at least one old virtual number has been deleted in the past;

receiving, via an application programming interface (API) of the processor, from the web browser extension on the web browser installed on the user device used by the user, an inquiry whether a notification comprising a request to generate a virtual number will be sent to a mobile device used by the user;

in response to a positive answer to the inquiry, transmitting the notification comprising the request to generate a virtual number to the mobile device used by the user, the notification being transmitted from the web browser extension to the mobile device used by the user; and upon receipt of an approval of the request, causing the web browser extension to execute a script to:

generate the virtual number, wherein generating the virtual number includes retrieving one of the at least one old virtual number, and associate the virtual number with the geolocation.

* * * * *